United States Patent Office 2,697,716
Patented Dec. 21, 1954

2,697,716

17α-METHYL-17β-HYDROXYANDROSTANE-3,6-DIONE AND PROCESS

Samuel H. Eppstein, Galesburg, and Hazel Marian Leigh, Kalamazoo, Mich., assignors to The Upjohn Company, Kalamazoo, Mich., a corporation of Michigan No Drawing. Application July 16, 1953,
Serial No. 368,494

3 Claims. (Cl. 260—397.4)

The present invention relates to a novel steroid compound, and is more particularly concerned with 17α-methyl-17β-hydroxyandrostane-3,6-dione, and with a process for the preparation thereof.

The novel compound of the present invention may be represented by the following structural formula:

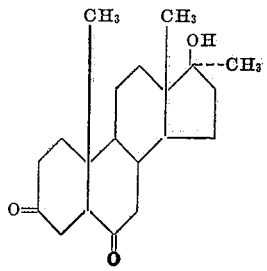

The process by which this compound is produced comprises rearrangement of 6β-hydroxy-17α-methyltestosterone to 17α-methyl-17β-hydroxyandrostane-3,6-dione, which is accomplished by treatment of 6β-hydroxy-17α-methyltestosterone with a solution containing a high concentration of hydrogen or hydroxyl ions.

It is an object of this invention to provide 17α-methyl-17β-hydroxyandrostane-3,6-dione and a process for its production. Other objects will be apparent to those skilled in the art to which this invention pertains.

The novel compound of this invention, 17α-methyl-17β-hydroxyandrostane-3,6-dione, is not only a pharmacologically and physiologically active compound possessing essentially protein anabolic, adrenocorticotropic hormonal and anesthetic properties, but is also a valuable intermediate for the synthesis of other steroids. For example, dehydration of 17α-methyl-17β-hydroxyandrostane-3,6-dione with phosphorus oxychloride and ozonization of the thus obtained 17-methyleneandrostane-3,6-dione yields the known androstane-3,6,17-trione [Balant and Ehrenstein, J. Org. Chem. 17, 1587 (1952)].

The starting material of the present invention is 6β-hydroxy-17α-methyltestosterone, which may be prepared by biooxidation of 17α-methyltestosterone with the aid of a mold of the *Rhizopus nigricans* strain as shown in Preparation 1.

In carrying out the process of the present invention, 6β-hydroxy-17α-methyltestosterone is dissolved in an excess of an organic carboxylic acid, for example, acetic, propionic, butyric, isobutyric, valeric, isovaleric, hexanoic, or other carboxylic acids containing less than nine carbon atoms which are liquids at the selected reaction temperature, i. e., between about zero and about eighty degrees centigrade, or in tertiary butyl alcohol, or the like. The preferred temperature range is fifteen to eighty degrees centigrade. The acids may also contain non-reactive substituents, such as mono or poly-halo, e. g., chloro, bromo, iodo, or hydroxy, methoxy, ethoxy, and the like if desired.

The solution of the steroid is then admixed with an acid catalyst such as a solution of hydrochloric, sulfuric, benzene-sulfonic acids, for example, para-toluenesulfonic acid, parachlorobenzene sulfonic acid, or with a suspension of an acidic resin or ion exchange resin containing carboxylic, sulfonic, or phosphonic acid groups, in an organic acid of the same nature as used for the preparation of the steroid solution or in tertiary butyl alcohol, or the like. The steroid solution, if in tertiary butyl alcohol, may also be admixed with a basic catalyst such as sodium or potassium hydroxide in tertiary butyl alcohol; however, acid catalysis is preferred. In the preferred embodiment of the invention, a solution is prepared from sulfuric acid and an organic acid containing between five to thirty percent sulfuric acid is added to the solution of the 6β-hydroxy-17α-methyltestosterone. The amount of sulfuric acid solution added to the steroid solution varies with the strength of the sulfuric acid solution. Ratios of one to twenty parts of the sulfuric acid solution and even more for 100 parts of the steroid solution are operative. Preferably about ten parts of the steroid solution are admixed with one part of a ten percent sulfuric acid solution in the selected organic acid and the mixture is allowed to stand at room temperature, e. g., about twenty to thirty degrees centigrade, for a period between six and 120 hours. The reaction time may be shortened if higher temperatures are selected. Temperatures between about zero and about eighty degrees centigrade are operative. The product is then separated from the reaction mixture by extracting the thus-obtained 17α-methyl-17β-hydroxyandrostane-3,6-dione from the neutralized or alkaline solution with an organic solvent such as ether, petroleum ether, ethyl acetate, chloroform, methylene dichloride, or other water-immiscible organic solvents, and is purified by recrystallization or chromatography.

The following examples are illustrative of the process of the present invention, but are not to be construed as limiting.

PREPARATION 1.—6β-HYDROXY-17α-METHYLTESTOSTERONE

A medium was prepared of twenty grams of Edamine enzymatic digest of lactalbumin, three grams of corn steep liquor, and fifty grams of technical dextrose diluted to one liter with water and adjusted to a pH of 4.3 to 4.5. Twelve liters of this sterilized medium was inoculated with *Rhizopus nigricans* minus strain, American Type Culture Collection Number 6227b, and incubated for 24 hours at a temperature of 28 degrees centigrade using a rate of aeration and stirring such that the oxygen uptake was 6.3 to 7 millimoles per hour per liter of $Na_2SO_3$ according to the method of Cooper, Fernstrom and Miller, Ind. Eng. Chem. 36, 504 (1944). To this medium containing a 24-hour growth of *Rhizopus nigricans* minus strain was added six grams of 17α-methyltestosterone in 120 milliliters of absolute ethanol to provide a suspension of the steroid in the culture. After an additional 24-hour period of incubation under the same conditions of temperature and aeration, the beer and mycelium were extracted. The mycelium was filtered, washed twice, each time with a volume of acetone approximately equal to the volume of the mycelium and extracted twice, each time with a volume of methylene chloride approximately equal to the volume of the mycelium. The acetone and methylene chloride extracts including solvent were added to the beer filtrate. The mixed extracts and beer filtrate were extracted successively with two one-half by volume portions of methylene chloride and then with two one-fourth by volume portions of methylene chloride. The combined methylene chloride extracts were washed with two one-tenth by volume portions of a two percent aqueous solution of sodium bicarbonate and then with two one-tenth by volume portions of water. After drying the methylene chloride with about three to five grams of anhydrous sodium sulfate per liter of solvent and filtering, the solvent was removed by distillation. The extractives obtained upon evaporation of the methylene chloride solvent were taken up in benzene to leave a residue of benzene insoluble crystals. These were washed with additional benzene to give 550 milligrams of white crystals. Recrystallization from a mixture of equal parts of ethyl acetate and acetone gave 500 milligrams of crystals melting at 220 to 235 degrees centigrade. These were redissolved in three milliliters of methanol and ether was added to reprecipitate the crystals. The resulting crystals of 6β-hydroxy-17α-methyltestosterone weighted 212 milligrams and had a melting point of 247 to 252 degrees centigrade. Infrared and ultraviolet spectra verified the structure.

Example 1.—17α-methyl-17β-hydroxyandrostane-3,6-dione

Twenty-six milligrams of 6β-hydroxy-17α-methyltestosterone was dissolved in 2.5 milliliters of acetic acid and thereto was added five drops of an acetic acid solution containing ten percent sulfuric acid. After allowing the reaction mixture to stand for 96 hours at room temperature, the mixture was made alkaline with an excess of one Normal aqueous sodium carbonate solution and extracted four times with 25-milliliter portions of methylene dichloride. The combined methylene dichloride extracts were washed with two ten-milliliter volumes of water, dried over anhydrous sodium sulfate, and evaporated to dryness. The residue of 29.3 milligrams was twice recrystallized from 0.2 milliliter of acetone by adding three drops of hexane to yield 3.7 milligrams of 17α-methyl-17β-hydroxyandrostane-3,6-dione of melting point 180 to 187.5 degrees centigrade. Infrared analysis confirmed the postulated structure of 17α-methyl-17β-hydroxyandrostane-3,6-dione. The mother liquors containing 22.5 milligrams of solids were chromatographed over 1.1 grams of alumina with 2.2-milliliter portions of solvents, giving the following fractions:

TABLE I

| Fraction | Solvent |
| --- | --- |
| 1 | benzene. |
| 2 | Do. |
| 3 | benzene-ether 19:1. |
| 4 | Do. |
| 5 | benzene-ether 9:1. |
| 6 | Do. |
| 7 | benzene-ether 1:1. |
| 8 | Do. |
| 9 | ether. |
| 10 | Do. |
| 11 | ether-chloroform 19:1. |
| 12 | Do. |
| 13 | ether-chloroform 9:1. |
| 14 | Do. |
| 15 | Do. |
| 16 | ether-chloroform 1:1. |
| 17 | Do. |
| 18 | Do. |
| 19 | chloroform. |
| 20 | Do. |
| 21 | Do. |
| 22 | chloroform-acetone 19:1. |
| 23 | chloroform-acetone 9:1. |
| 24 | acetone. |
| 25 | methanol. |
| 26 | Do. |

Fractions 16 to 19, inclusive, were combined and yielded upon evaporation 6.5 milligrams of eluates which were recrystallized from four drops of acetone and two drops of n-hexane to give additional amounts of 17α-methyl-17β-hydroxyandrostane-3,6-dione. Infrared analysis confirmed the structure of the product as 17α-methyl-17β-hydroxyandrostane-3,6-dione.

Example 2.—17α-methyl-17β-hydroxyandrostane-3,6-dione

In the same manner as in Example 1, by treatment of a solution of 6β-hydroxy-17α-methyltestosterone dissolved in propionic acid with a solution of hydrochloric acid in propionic acid, 17α-methyl-17β-hydroxyandrostane-3,6-dione is obtained.

Example 3.—17α-methyl-17β-hydroxyandrostane-3,6-dione

In the same manner as in Example 1, by treatment of a solution of 6β-hydroxy-17α-methyltestosterone dissolved in butyric acid with a solution of para-toluenesulfonic acid in butyric acid, 17α-methyl-17β-hydroxyandrostane-3,6-dione is obtained.

Example 4.—17α-methyl-17β-hydroxyandrostane-3,6-dione

In the same manner as in Example 1, by treatment of a solution of 6β-hydroxy-17α-methyltestosterone dissolved in tertiary butyl alcohol with a solution of para-toluenesulfonic acid in tertiary butyl alcohol, 17α-methyl-17β-hydroxyandrostane-3,6-dione is obtained.

In a similar manner 17α-methyl-17β-hydroxyandrostane-3,6-dione may be obtained by treating 6α-hydroxy-17α-methyltestosterone in a solution of an organic carboxylic acid in tertiary butyl alcohol at a temperature between about zero and about eighty degrees centigrade, preferably fifteen to eighty degrees centigrade, with an acid catalyst, dissolved in a similar organic carboxylic acid, such as valeric, isovaleric, hexanoic, heptanoic, dichloroacetic, trimethylacetic and similar acids.

It is to be understood that this invention is not to be limited to the exact details of operation shown and described as obvious modifications and equivalents will be apparent to one skilled in the art and the invention is therefore to be limited only by the scope of the appended claims.

We claim:
1. 17α-methyl-17β-hydroxyandrostane-3,6-dione.
2. A process for the production of 17α-methyl-17β-hydroxyandrostane-3,6-dione which comprises: reacting at a temperature between zero and eighty degrees centigrade 6-hydroxy-17α-methyltestosterone, dissolved in an organic solvent, selected from the group consisting of organic carboxylic acids, containing less than nine carbon atoms and tertiary butyl alcohol with an acidic catalyst to obtain 17α-methyl-17β-hydroxyandrostane-3,6-dione.
3. A process for the production of 17α-methyl-17β-hydroxyandrostane-3,6-dione which comprises: reacting at a temperature between zero and eighty degrees centigrade 6β-hydroxy-17α-methyltestosterone, dissolved in an organic solvent, with a catalyst selected from the group consisting of acids and bases to obtain 17α-methyl-17β-hydroxyandrostane-3,6-dione.

No references cited.